US009280527B2

(12) United States Patent  
Baikov et al.

(10) Patent No.: US 9,280,527 B2  
(45) Date of Patent: *Mar. 8, 2016

(54) METHOD AND SYSTEM FOR DIRECTLY MAPPING WEB SERVICES INTERFACES AND JAVA INTERFACES

(71) Applicant: SAP SE, Walldorf (DE)

(72) Inventors: Chavdar S. Baikov, Sofia (BG); Dimitar Angelov, Montana (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,912

(22) Filed: Sep. 21, 2015

(65) Prior Publication Data

US 2016/0012026 A1    Jan. 14, 2016

Related U.S. Application Data

(63) Continuation of application No. 14/082,647, filed on Nov. 18, 2013, now Pat. No. 9,141,592, which is a continuation of application No. 12/629,819, filed on Dec. 2, 2009, now Pat. No. 8,589,518, which is a continuation of application No. 11/239,546, filed on Sep. 28, 2005, now abandoned.

(51) Int. Cl.
*G06F 15/177* (2006.01)
*G06F 17/22* (2006.01)

(52) U.S. Cl.
CPC .................. *G06F 17/2247* (2013.01)

(58) Field of Classification Search
CPC ....... G06F 8/65; G06F 9/541; G06F 17/2247; H04L 67/02; H04L 67/10
See application file for complete search history.

(56) References Cited

U.S. PATENT DOCUMENTS

| | | |
|---|---|---|
| 6,202,207 B1 | 3/2001 | Donohue |
| 6,604,113 B1 | 8/2003 | Kenyon et al. |
| 6,954,792 B2 | 10/2005 | Kang et al. |
| 7,159,224 B2 | 1/2007 | Sharma et al. |
| 7,184,922 B2 | 2/2007 | Ousley et al. |
| 7,231,435 B2 | 6/2007 | Ohta |

(Continued)

FOREIGN PATENT DOCUMENTS

| | | |
|---|---|---|
| EP | 1318461 A1 | 6/2003 |
| EP | 1387262 A1 | 2/2004 |

(Continued)

OTHER PUBLICATIONS

"U.S. Appl. No. 10/749,666, Non Final Office Action mailed Nov. 24, 2008", 13 pgs.

(Continued)

*Primary Examiner* — Jonathan Bui
(74) *Attorney, Agent, or Firm* — Schwegman Lundberg & Woessner, P.A.

(57) ABSTRACT

A method and system for directly mapping web services interfaces and Java interfaces. In one embodiment, default mapping information is identified, the default mapping information having default interface mapping information and default schema to Java mapping information. The default mapping information is then update and a mapping descriptor having the updated mapping information is generated. The updated information contains updated interface mapping information and updated schema to Java mapping information.

20 Claims, 9 Drawing Sheets

(56) References Cited

U.S. PATENT DOCUMENTS

| | | | |
|---|---|---|---|
| 7,277,935 B2 | 10/2007 | Sato | |
| 7,284,039 B2 | 10/2007 | Berkland et al. | |
| 7,366,717 B2* | 4/2008 | Warshavsky | G06F 17/30569 |
| 7,373,661 B2 | 5/2008 | Smith et al. | |
| 7,376,959 B2* | 5/2008 | Warshavsky | G06F 9/541 |
| | | | 709/201 |
| 7,409,709 B2 | 8/2008 | Smith et al. | |
| 7,421,495 B2 | 9/2008 | Yang et al. | |
| 7,467,162 B2 | 12/2008 | Rosenbloom et al. | |
| 7,617,480 B2 | 11/2009 | Falter et al. | |
| 7,640,348 B2* | 12/2009 | Atwal | G06Q 30/02 |
| | | | 370/254 |
| 7,673,282 B2 | 3/2010 | Amaru et al. | |
| 7,693,955 B2* | 4/2010 | Karakashian | H04L 67/02 |
| | | | 709/201 |
| 7,698,684 B2 | 4/2010 | Baikov | |
| 7,831,693 B2* | 11/2010 | Lai | G06Q 10/10 |
| | | | 706/27 |
| 7,877,725 B2 | 1/2011 | Vitanov et al. | |
| 7,877,726 B2 | 1/2011 | Sabbouh | |
| 7,945,893 B2 | 5/2011 | Angrish et al. | |
| 8,099,709 B2 | 1/2012 | Baikov | |
| 8,108,830 B2* | 1/2012 | Bibr | G06F 9/4443 |
| | | | 715/239 |
| 8,250,522 B2 | 8/2012 | Baikov et al. | |
| 8,589,518 B2 | 11/2013 | Baikov et al. | |
| 8,700,681 B2 | 4/2014 | Baikov | |
| 9,141,592 B2 | 9/2015 | Baikov et al. | |
| 2001/0029604 A1 | 10/2001 | Dreyband et al. | |
| 2002/0143819 A1 | 10/2002 | Han et al. | |
| 2003/0004746 A1 | 1/2003 | Kheirolomoom et al. | |
| 2003/0005181 A1 | 1/2003 | Bau et al. | |
| 2003/0055878 A1 | 3/2003 | Fletcher et al. | |
| 2003/0084056 A1 | 5/2003 | DeAnna et al. | |
| 2003/0110242 A1 | 6/2003 | Brown et al. | |
| 2003/0110373 A1 | 6/2003 | Champion | |
| 2003/0163450 A1 | 8/2003 | Borenstein et al. | |
| 2003/0191803 A1 | 10/2003 | Chinnici et al. | |
| 2003/0204645 A1* | 10/2003 | Sharma | G06F 8/10 |
| | | | 719/328 |
| 2003/0208505 A1* | 11/2003 | Mullins | G06F 17/30607 |
| 2003/0226139 A1 | 12/2003 | Lee | |
| 2004/0003033 A1 | 1/2004 | Kamen et al. | |
| 2004/0015564 A1 | 1/2004 | Williams | |
| 2004/0017392 A1 | 1/2004 | Welch | |
| 2004/0045005 A1 | 3/2004 | Karakashian | |
| 2004/0054969 A1 | 3/2004 | Chiang et al. | |
| 2004/0068554 A1 | 4/2004 | Bales et al. | |
| 2004/0088352 A1 | 5/2004 | Kurth | |
| 2004/0181537 A1 | 9/2004 | Chawla et al. | |
| 2004/0199896 A1 | 10/2004 | Goodman et al. | |
| 2004/0216086 A1 | 10/2004 | Bau | |
| 2005/0080801 A1* | 4/2005 | Kothandaraman | H04L 67/06 |
| 2005/0091087 A1 | 4/2005 | Smith et al. | |
| 2005/0091639 A1 | 4/2005 | Patel | |
| 2005/0114394 A1 | 5/2005 | Kaipa et al. | |
| 2005/0125524 A1 | 6/2005 | Chandrasekhar et al. | |
| 2005/0138041 A1 | 6/2005 | Alcorn et al. | |
| 2005/0149552 A1* | 7/2005 | Chan | G06F 17/30292 |
| 2005/0154785 A1 | 7/2005 | Reed et al. | |
| 2005/0172261 A1 | 8/2005 | Yuknewicz et al. | |
| 2005/0203933 A1* | 9/2005 | Chaudhuri | G06F 17/30917 |
| 2005/0216488 A1 | 9/2005 | Petrov et al. | |
| 2005/0246656 A1 | 11/2005 | Vasilev et al. | |
| 2005/0273703 A1 | 12/2005 | Doughan | |
| 2005/0278270 A1 | 12/2005 | Carr et al. | |
| 2006/0004746 A1 | 1/2006 | Angus et al. | |
| 2006/0015625 A1 | 1/2006 | Ballinger et al. | |
| 2006/0029054 A1 | 2/2006 | Breh et al. | |
| 2006/0031433 A1* | 2/2006 | Patrick | H04L 67/2823 |
| | | | 709/220 |
| 2006/0041636 A1 | 2/2006 | Ballinger et al. | |
| 2006/0048097 A1* | 3/2006 | Doshi | G06F 8/315 |
| | | | 717/120 |
| 2006/0136351 A1 | 6/2006 | Angrish et al. | |
| 2006/0173984 A1 | 8/2006 | Emeis et al. | |
| 2006/0190580 A1 | 8/2006 | Shu et al. | |
| 2006/0200748 A1 | 9/2006 | Shenfield | |
| 2006/0200749 A1 | 9/2006 | Shenfield | |
| 2006/0206890 A1 | 9/2006 | Shenfield et al. | |
| 2006/0236302 A1 | 10/2006 | Bateman et al. | |
| 2006/0236306 A1 | 10/2006 | DeBruin et al. | |
| 2007/0050482 A1* | 3/2007 | Sundstrom | G06F 17/3089 |
| | | | 709/220 |
| 2007/0064680 A1 | 3/2007 | Savchenko et al. | |
| 2007/0073221 A1 | 3/2007 | Bialecki et al. | |
| 2007/0073753 A1 | 3/2007 | Baikov | |
| 2007/0073760 A1 | 3/2007 | Baikov | |
| 2007/0073769 A1 | 3/2007 | Baikov et al. | |
| 2007/0073771 A1* | 3/2007 | Baikov | G06F 8/65 |
| 2007/0073849 A1 | 3/2007 | Baikov et al. | |
| 2007/0118844 A1 | 5/2007 | Huang et al. | |
| 2007/0156872 A1 | 7/2007 | Stoyanova | |
| 2007/0203820 A1 | 8/2007 | Rashid | |
| 2007/0204279 A1* | 8/2007 | Warshavsky | G06F 9/547 |
| | | | 719/330 |
| 2007/0245167 A1 | 10/2007 | De La Cruz et al. | |
| 2008/0189713 A1 | 8/2008 | Betzler et al. | |
| 2008/0307392 A1 | 12/2008 | Racca et al. | |
| 2010/0077070 A1 | 3/2010 | Baikov et al. | |
| 2014/0075291 A1 | 3/2014 | Baikov et al. | |

FOREIGN PATENT DOCUMENTS

| | | |
|---|---|---|
| EP | 1566940 A1 | 8/2005 |
| WO | WO-03073309 A1 | 9/2003 |

OTHER PUBLICATIONS

"U.S. Appl. No. 10/749,735, Non Final Office Action mailed Mar. 17, 2008", 27 pgs.

"U.S. Appl. No. 10/750,058, Non Final Office Action mailed Dec. 23, 2008", 12 pgs.

"U.S. Appl. No. 11/232,660, Non Final Office Action mailed Dec. 22, 2008", 18 pgs.

"U.S. Appl. No. 11/232,717, Non Final Office Action mailed Feb. 26, 2009", 18 pgs.

"U.S. Appl. No. 11/233,203, Non Final Office Action mailed Jan. 27, 2009", 14 pgs.

"U.S. Appl. No. 11/238,244, Advisory Action mailed Sep. 21, 2009", 3 pgs.

"U.S. Appl. No. 11/238,244, Appeal Brief filed Aug. 23, 2010", 27 pgs.

"U.S. Appl. No. 11/238,244, Appeal Brief filed Sep. 7, 2010", 27 pgs.

"U.S. Appl. No. 11/238,244, Appeal Brief filed Oct. 3, 2011", 25 pgs.

"U.S. Appl. No. 11/238,244, Appeal Decision mailed Dec. 26, 2014", 7 pgs.

"U.S. Appl. No. 11/238,244, Examiner's Answer mailed Dec. 19, 2011", 29 pgs.

"U.S. Appl. No. 11/238,244, Final Office Action mailed May 5, 2011", 27 pgs.

"U.S. Appl. No. 11/238,244, Final Office Action mailed Jun. 3, 2009", 24 pgs.

"U.S. Appl. No. 11/238,244, Final Office Action mailed Jun. 11, 2010", 25 pgs.

"U.S. Appl. No. 11/238,244, Non Final Office Action mailed Oct. 27, 2008", 21 pgs.

"U.S. Appl. No. 11/238,244, Non Final Office Action mailed Nov. 24, 2010", 36 pgs.

"U.S. Appl. No. 11/238,244, Non-Final Office Action mailed Dec. 17, 2009", 24 pgs.

"U.S. Appl. No. 11/238,244, Response filed Feb. 9, 2011 to Non Final Office Action mailed Nov. 24, 2010", 16 pgs.

"U.S. Appl. No. 11/238,244, Response Filed Feb. 26, 2015 to Final Office Action mailed May 5, 2011 and Appeal Decision mailed Dec. 26, 2014.", 13 pgs.

"U.S. Appl. No. 11/238,244, Response filed Feb. 27, 2009 to Non Final Office Action mailed Oct. 27, 2008", 13 pgs.

"U.S. Appl. No. 11/238,244, Response filed Mar. 11, 2010 to Non Final Office Action mailed Dec. 17, 2009", 12 pgs.

(56) References Cited

OTHER PUBLICATIONS

"U.S. Appl. No. 11/238,244, Response filed Sep. 3, 2009 to Final Office Action mailed Jun. 3, 2009", 11 pgs.
"U.S. Appl. No. 11/238,244, Response filed Oct. 5, 2009 to Advisory Action mailed Sep. 21, 2009", 14 pgs.
"U.S. Appl. No. 11/238,873, Final Office Action mailed May 10, 2010", 14 pgs.
"U.S. Appl. No. 11/238,873, Final Office Action mailed May 11, 2011", 14 pgs.
"U.S. Appl. No. 11/238,873, Non Final Office Action mailed Dec. 8, 2010", 12 pgs.
"U.S. Appl. No. 11/238,873, Non-Final Office Action mailed Jul. 7, 2009", 14 pgs.
"U.S. Appl. No. 11/238,873, Notice of Allowance mailed Apr. 19, 2012", 10 pgs.
"U.S. Appl. No. 11/238,873, Response filed Mar. 3, 2011 to Non Final Office Action mailed Dec. 8, 2010", 12 pgs.
"U.S. Appl. No. 11/238,873, Response filed Jul. 23, 2010 to Final Office Action mailed May 10, 2010", 10 pgs.
"U.S. Appl. No. 11/238,873, Response filed Aug. 9, 2011 to Final Office Action mailed May 11, 2011", 14 pgs.
"U.S. Appl. No. 11/238,873, Response filed Oct. 29, 2009 to Non Final Office Action mailed Jul. 7, 2009", 14 pgs.
"U.S. Appl. No. 11/238,912, 312 Amendment filed Feb. 19, 2014", 15 pgs.
"U.S. Appl. No. 11/238,912, Advisory Action mailed Jul. 9, 2008", 3 pgs.
"U.S. Appl. No. 11/238,912, Appeal Brief filed Jun. 28, 2010", 23 pgs.
"U.S. Appl. No. 11/238,912, Appeal Decision mailed Aug. 20, 2013", 5 pgs.
"U.S. Appl. No. 11/238,912, Decision on Pre-Appeal Brief Request mailed May 28, 2010", 2 pgs.
"U.S. Appl. No. 11/238,912, Examiner's Answer to Appeal Brief mailed Sep. 15, 2010", 9 pgs.
"U.S. Appl. No. 11/238,912, Final Office Action mailed Jan. 20, 2010", 8 pgs.
"U.S. Appl. No. 11/238,912, Final Office Action mailed Feb. 4, 2009", 9 pgs.
"U.S. Appl. No. 11/238,912, Final Office Action mailed Apr. 30, 2008", 9 pgs.
"U.S. Appl. No. 11/238,912, Non Final Office Action mailed Jun. 26, 2009", 12 pgs.
"U.S. Appl. No. 11/238,912, Non Final Office Action mailed Sep. 10, 2008", 9 pgs.
"U.S. Appl. No. 11/238,912, Non Final Office Action mailed Nov. 16, 2007", 10 pgs.
"U.S. Appl. No. 11/238,912, Notice of Allowance mailed Nov. 19, 2013", 12 pgs.
"U.S. Appl. No. 11/238,912, Pre-Appeal Brief Request mailed Mar. 18, 2010", 5 pgs.
"U.S. Appl. No. 11/238,912, Preliminary Amendment filed Jul. 30, 2008", 10 pgs.
"U.S. Appl. No. 11/238,912, Response filed Jan. 11, 2008 to Non Final Office Action mailed Nov. 16, 2007", 9 pgs.
"U.S. Appl. No. 11/238,912, Response filed Apr. 17, 2009 to Final Office Action mailed Feb. 4, 2009", 11 pgs.
"U.S. Appl. No. 11/238,912, Response filed Jun. 20, 2008 to Final Office Action mailed Apr. 30, 2008", 10 pgs.
"U.S. Appl. No. 11/238,912, Response filed Sep. 28, 2009 to Non Final Office Action mailed Jun. 26, 2009", 10 pgs.
"U.S. Appl. No. 11/238,912, Response filed Oct. 31, 2008 to Non Final Office Action mailed Sep. 10, 2008", 11 pgs.
"U.S. Appl. No. 11/238,912, Supplemental Examiner's Answer to Appeal Brief mailed Sep. 28, 2010", 2 pgs.
"U.S. Appl. No. 11/238,920, Non Final Office Action mailed Mar. 12, 2009", 10 pgs.

"U.S. Appl. No. 11/238,921, Non Final Office Action mailed Oct. 30, 2008", 12 pgs.
"U.S. Appl. No. 11/238,921, Notice of Allowance mailed Sep. 3, 2009", 14 pgs.
"U.S. Appl. No. 11/238,921, Notice of Allowance mailed Nov. 19, 2009", 7 pgs.
"U.S. Appl. No. 11/238,921, Response filed Mar. 2, 2009 to Non Final Office Action mailed Oct. 30, 2008", 31 pgs.
"U.S. Appl. No. 11/238,921, Response filed Jun. 23, 2009 to Non Final Office Action mailed Oct. 30, 2008", 32 pgs.
"U.S. Appl. No. 11/239,546, Advisory Action mailed Aug. 3, 2009", 3 pgs.
"U.S. Appl. No. 11/239,546, Non Final Office Action mailed Jun. 2, 2009", 17 pgs.
"U.S. Appl. No. 11/239,546, Non Final Office Action mailed Dec. 18, 2008", 10 pgs.
"U.S. Appl. No. 11/239,546, Response filed Feb. 27, 2009 to Non Final Office Action mailed Dec. 18, 2008", 5 pgs.
"U.S. Appl. No. 11/239,546, Response filed Jul. 20, 2009 to Final Office Action mailed May 19, 2009", 9 pgs.
"U.S. Appl. No. 11/322,567, Non Final Office Action mailed Dec. 31, 2007", 12 pgs.
"U.S. Appl. No. 12/628,819, Non Final Office Action mailed May 16, 2011", 8 pgs.
"U.S. Appl. No. 12/629,819, Examiner Interview Summary mailed Jul. 11, 2013", 2 pgs.
"U.S. Appl. No. 12/629,819, Final Office Action mailed Nov. 22, 2011", 9 pgs.
"U.S. Appl. No. 12/629,819, Notice of Allowance mailed Jul. 15, 2013", 14 pgs.
"U.S. Appl. No. 12/629,819, Preliminary Amendment mailed Jan. 14, 2010", 8 pgs.
"U.S. Appl. No. 12/629,819, Response filed Feb. 21, 2012 to Final Office Action mailed Nov. 22, 2011", 11 pgs.
"U.S. Appl. No. 12/629,819, Response filed Aug. 1, 2011 to Non Final Office Action mailed May 16, 2011", 9 pgs.
"U.S. Appl. No. 14/082,647, Notice of Allowance mailed Jun. 4, 2015", 12 pgs.
"U.S. Appl. No. 14/082,647, Preliminary Amendment mailed Dec. 5, 2013", 6 pgs.
"The J2EE Tutorial: Web Application Archives", Sun.com [Online]. Retrieved from the Internet: <URL: http://www.sun.com/j2ee/tutorial/1-3-fcs/doc/WCC3.html>, (Accessed Nov. 4, 2008), 1-4.
Abdel-Aziz, A.A., et al., "Mapping XML DTDs to Relational Schemes", IEEE, (2005), 1-4.
Amer-Yahia, S., et al., "A Web-Services Architecture for Efficient XML Data Exchange", IEEE, (2004), 1-12.
Anwar, Muhammad, et al., "Multi-Agent Based Semantic E-Government Web Service Architecture Using Extended WSDL", http://delivery.acm.org/10.1145/1200000/1194805/27490599.pdf, (Dec. 2006), 4 pgs.
Banerji, A., et al., "Web Services Conversation Language (WSCL) 1.0", W3C Note, World Wide Web Consortium, [Online]. Retrieved from the Internet: <URL: http://www.w3.org/TR/wscl10/>, (Mar. 2002), 22 pgs.
Barrett, Ronan, et al., "Model Driven Distribution Pattern Design for Dynamic Web Service Compositions", http://delivery.acm.org/10.1145/1150000/1145612/p129-barrett.pdf, (Jul. 2006), 8 pgs.
Brambilla, Marco, et al., "Model-Driven Design and Developement of Semantic Web Service Applications", http://delivery.acm.org/10.1145/1300000/1294151/a3-brambilla.pdf, (Nov. 2007), 31 pgs.
Bussler, Christopher, et al., "A conceptual architecture for semantic web enabled services", Dieter Fensel, Alexander Maedche, ACM SIGMOD Record, v. 31, n. 4, (Dec. 2002), 6 pgs.
Dustdar, Schahram, et al., "A View Based Analysis on Web Service Registries", Martin Treiber, Ditributed and Parallel Databases, v. 18, n. 2, (Sep. 2005), 147-171.

(56) References Cited

OTHER PUBLICATIONS

Ege, R. K., "Object-Oriented Database Access via Reflection", IEEE, (1999), 36-41.

Huhns, Michael N., et al., "Service-Oriented Computing: Key Concepts and Principles", IEEE Internet Computing, Munindar P. Singh, v.9, n. 1, (Jan. 2005), 75-81.

Hull, Richard, et al., "Tools for Composite Web Services: A Short Overview", Jianwen Su, ACM SIGMOD Record, v. 34, No. 2, (Jun. 2005), 10 pgs.

Shepherd, George, et al., "Programming with Microsoft Visual C++.Net", Microsoft Press Sixth Edition, (2003), 391-397, 771, 806-807, 820-826.

Thomas-Kerr, J., et al., "Bitstream Binding Language – Mapping XML Multimedia Containers into Streams", IEEE, (2005), 1-4.

U.S. Appl. No. 11/238,244, Non Final Office Action mailed Oct. 6, 2015, 29 pgs.

U.S. Appl. No. 11/238,244, Response filed Jan. 5, 2016 to Non Final Office Action mailed Oct. 6, 2015.

\* cited by examiner

METHOD AND SYSTEM FOR DIRECTLY MAPPING WEB SERVICES INTERFACES AND JAVA INTERFACES

CLAIM OF PRIORITY

This application is a continuation of U.S. application Ser. No. 14/082,647, filed Nov. 18, 2013, which is a continuation of U.S. application Ser. No. 12/629,819 filed, Dec. 2, 2009, which Issued on Nov. 19, 2013 as U.S. Pat. No. 8,589,518, which is a continuation of U.S. application Ser. No. 11/239,546 filed Sep. 28, 2005, which applications are incorporated in their entirety herein by reference.

TECHNICAL FIELD

Embodiments of the invention generally relate to the field of web services and, more particularly, to a system and method for directly mapping web services interfaces and Java interfaces.

BACKGROUND

Efforts are being made to more easily conduct business in a web-based environment. "Web Services" is loosely understood to mean the ability to discover and conduct business in a web-based environment. For example, a user (e.g., a web-based application or person with a web browser) may: 1) search through an online registry of businesses and/or services; 2) find a listing in the registry for web based access to a service that that the user desires to have performed; and then, 3) engage in a web based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasingly important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

FIG. 1 illustrates a prior art web services platform 100. The platform 100 shows various XML-related standards 102-110 that are used in connection with web services to attempt interoperability. The illustrated standards include XML Namespaces 102, similar to Java package names, to provide syntax for data representation in portable format. SOAP 104 refers to a standard packaging format for transmitting XML data between applications over a network. XML schema 106 refers to the World Wide Web Consortium (W3C) schema specification for XML documents. WSDL 108 refers to the standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

However, the open standards are not evolving fast enough to keep up with the increasing demand for web services and needs of additional flexibility and control on the client-side. One of the problems today is the convoluted relationships and mappings between relevant standards. Neither the interoperability nor the client-side flexibility are sufficiently achieved because of the conventional separation of standards, models, and entities for web services (WS) and web services client (WSC). FIG. 2 illustrates a prior art web services model 200. The illustrated web services model 200 includes Web service definition 204, which includes the description of design-time configuration of a web service. Web service configurations 206 refer to the description of the run-time configurations of a web service. The web services model 200 further includes a virtual interface 202. A virtual interface 202 refers to an abstract interface.

Referring now to FIG. 3, it illustrates a prior art web services client model 300. In the illustrated web services client model 300, schema to Java (STJ) mappings 302 contain serializer classes and deserializer classes of the XML Schema Definition (XSD) Types. However, the conventional STJ mappings 302 do not contain any field or operation-specific mappings. The conventional model 300 further includes logical ports 304 that are limited to containing merely runtime (RT) relevant configurations and do not contain design-time (DT) configurations. Finally, the illustrated WSDL 306 contains a parsed WSDL structure.

Although the conventional models 200, 300 provide some flexibility, further improvements are needed to achieve interoperability. For example, the conventional model 200 provides provider-oriented inside-out approach for web services, but it does not support consumer-based outside-in approach for web services, which is becoming increasingly important. The conventional models 200, 300 do not provide similar modeling approach for developing web services and web services client which leads to usability deficiencies.

SUMMARY

A method and system are provided for directly mapping web services interfaces and Java interfaces. In one embodiment, default mapping information is identified, the default mapping information having default interface mapping information and default schema to Java mapping information. The default mapping information is then update and a mapping descriptor having the updated mapping information is generated. The updated information contains updated interface mapping information and updated schema to Java mapping information.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
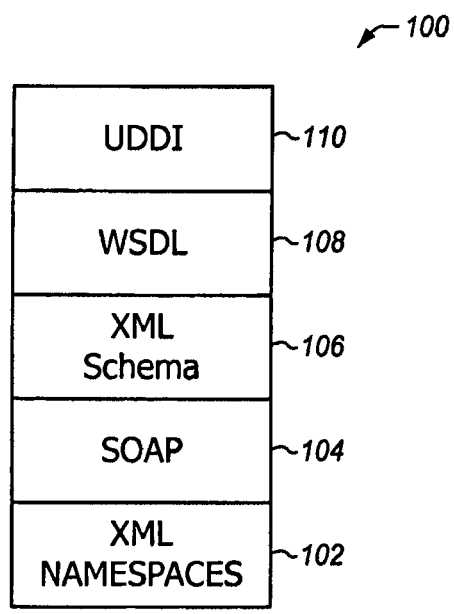
FIG. 1 illustrates a prior art web services platform.
Figure 2:
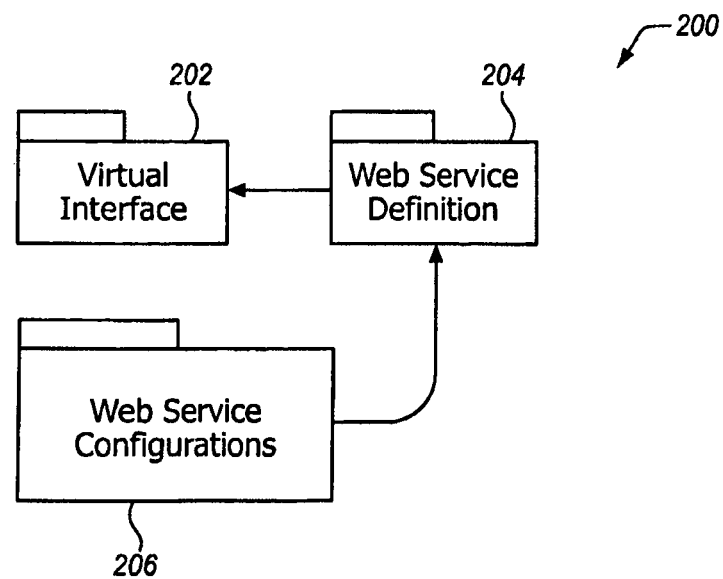
FIG. 2 illustrates a prior art web services model.
Figure 3:
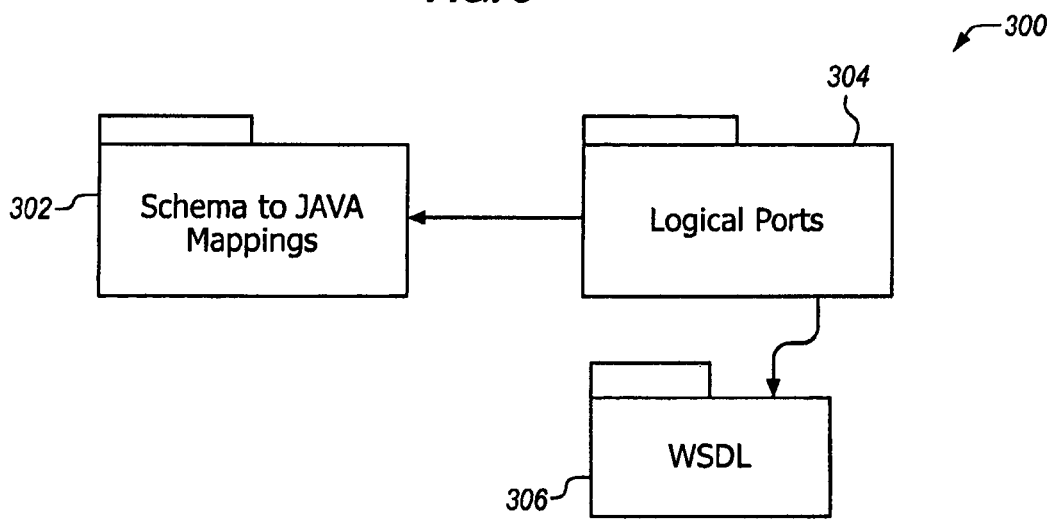
FIG. 3 illustrates a prior art web services client model.

Described below is a system and method for directly mapping web services interfaces and Java interfaces. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 4:
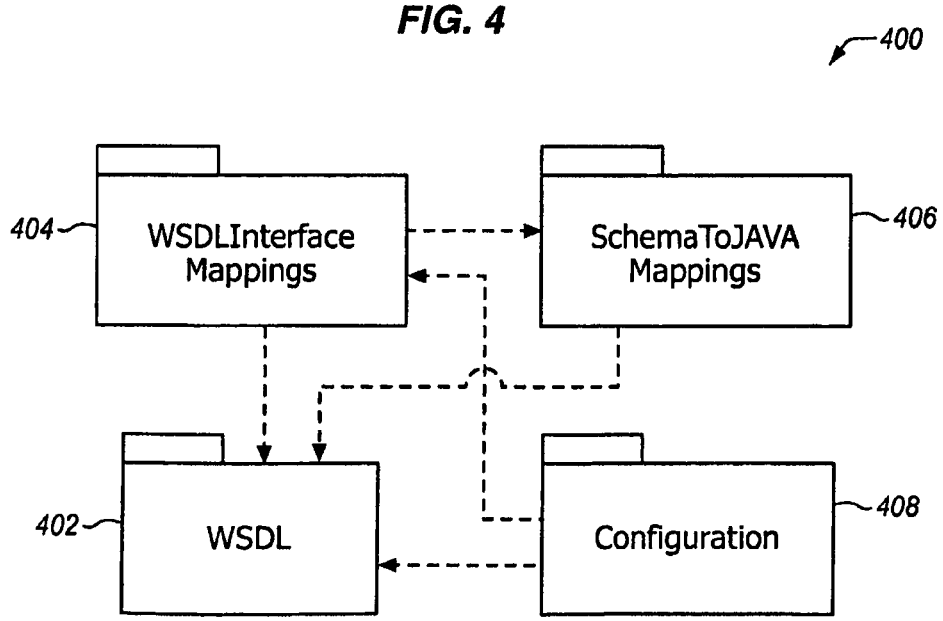
FIG. 4 illustrates an embodiment of a common meta model for web services and web services client.

FIG. 4 illustrates an embodiment of a common meta model 400 for web services and web services client. In the illustrated embodiment, a common web services meta model 400 is generated by combining various models 402-408 into a single common model (common model) 400. For example, the common model 400 includes a WSDL model 402, which refers to a model for describing the WSDL structure of the web services that are developed within an application, and/or WSDL files that are used to generate WS client proxies. The WSDL model 402 may also contain WSDL relevant extensions. The WSDL interface mappings (WSDL IM) model 404 refers to a model for describing mappings between the Java Service Endpoint (JSE) Interface (e.g., generated proxy service interface) and its WSDL representation, such as the names of the Java method and WSDL operation representing the method, default values of parameters, etc.

The illustrated Schema to Java mappings model 406 is used for describing mappings between XSD types and Java classes representing these types, such as the names of the fields. The configuration model 408 includes the design-time and runtime configuration of web services and web services client. The configuration model 408 logically references the WSDL model 402 and the WSDL IM model 404, which, in turn, references the STJ mappings model 406.

As illustrated, in one embodiment, a common model 400 is provided for WS and WSC frameworks to perform development, deployment and configuration of applications with relative ease. WS and WSC frameworks may reside on a Java 2 Enterprise Edition (J2EE) engine. In one embodiment, the common model 400 is migrated to the J2EE engine to run and use the WS/WSC proxy on the J2EE engine to provide a common model for WS and WSC frameworks. Such migration can be performed using various migration controllers and interfaces that are used for application development. In one embodiment, the common configuration is achieved by having a common configuration entity in the configuration model 408. Common design utilities are provided using a common interface mapping model 404 and a common schema to Java mapping model 406, while common deployment entities are provided with insignificant differences between client and server.

In one embodiment, common models 402-408 are managed by a common framework at the J2EE engine. The common model 400 is created by, first, identifying those elements, features, and components (components or properties) that are common to both web services model and web services client model. Once such common components are identified, they are then extracted and put together to create a common WS model. It is contemplated that those components that are necessary and/or preferred are used to create the common framework, while those components that are not regarded as necessary and/or preferred may not be used. Further, the use of such common components helps support the deployment of web services and web services client in a common way. For example, SAP administrative tools model can be converted in light of the common framework to separate the WS tools in the SAP Administrative tools from the J2EE engine because of the different requirements associated with the SAP Administrative tools and the J2EE engine. Examples of administrative tools include various Integrated Development Environment (IDE) tools (e.g., IDE wizard and IDE views) and other SAP-based IDE and administrative tools, such as SAP NetWeaver Developer Studio, SAP Visual Administrator, and SAP NetWeaver Administrator. Further, SAP's IDE can be based on the Eclipse IDE and may contain additional SAP developed plugins.

In the illustrated embodiment, the common model 400 combines the requirements from both the provider and consumer scenarios and is suitable to be used by both the service and client platforms. This is performed such that the common elements of functionality are adopted, while the uncommon elements work side-by-side not only without interfering with each other, but by complementing each other in the common model 400. In one embodiment, common models 402-408 are generated and employed and further, they are directly mapped in a common model 400 via any number of programming languages that are right for the time (e.g., C, C++, C#, Java, and ABAP). Further, a generator, such as a proxy generator or a code generator, modules, interfaces, and components are employed to form common models 402-408, generate WSDL model, form direct mapping between models 402-408 and between web services interfaces and Java interfaces.

The common model 400 eliminates the need for the conventional virtual interface for storing the data (e.g., description of the interface and its types). In one embodiment, web services interface data is separate between the WSDL model 402 and the two mapping models 404, 406. Using this technique, SOAP extensions are not longer necessary as the need for VI to WSDL conversion is eliminated. Using the common model 400, web interfaces are described in the WSDL model 402 as opposed to a virtual interface. Further, the interface mapping information is used to describe the mapping of web interfaces to Java interfaces (e.g., Java SEI). Then, multiple design time configurations can be attached to a single interface as an alternative.

Furthermore, the web services definition, which can be used to describe an alternative design-time configuration, is made part of the design-time part of the configuration model 408. This helps eliminate the need for generating several portTypes based on the web services definition, which would otherwise be necessary because the configuration would have to be expressed in the form of WSDL extensions. In one embodiment, a WS-policy standard is used to express configuration of web services and consequently, several alternative configurations can be expressed using one WSDL portType. A WS-policy standard can be dynamically created in which various parameters can be defined as necessary or desired. Further, a client proxy generated out of such WSDL may contain a single service endpoint interface (SEI), which has a superior use for the application developer using it as proxy. An SEI can be used to specify methods of the Java class that are to be exposed as web services operations, which are included and published in the WSDL model 402 as the portType that a client application uses to invoke web services.

In one embodiment, the STJ mappings model 406 contains not only serializer and deserializer classes, but also other field and operation-specific mappings information. Using the STJ mappings model 406 having such information helps facilitate various kinds of mappings, such as names of getter/setter methods of a specific field, if an attribute is presented as a data member or with getters/setters, etc. Moreover, although the conventional logical ports are limited to containing only real-time configurations, the illustrated embodiment of the configuration model 408 contains and maintains not only real-time configuration information, but also contains and maintains design-time configuration information. Various mapping files and interfaces may be used to map the individual models 402-408 into the common model 400.

The illustrated WSDL model 402 includes a WSDL file that specifies the WSDL structure, including message formats, Internet protocols, and addresses, that a client may use to communicate with a particular web service. Using the basic structure of WSDL, a WSDL document includes an XML document that adheres to the WSDL XML schema. A WSDL document contains various components and elements (e.g., biding, import, message, operation, portType, service, and types) that are rooted in the root element (e.g., definitions element) of the WSDL document.

The binding element is used to assign portTypes and its operation elements to a particular protocol (e.g., SOAP) and encoding style. The import element is used to import WSDL definitions from other WSDL documents (such as those similar to an XML schema document import element). The message element describes the message's payload using XML schema built-in types, complex types, and/or elements defined in the WSDL document's type elements. The operation and portType elements describe web service's interface and define its methods and are similar to Java interfaces and their method declarations. The service element is used for assigning an Internet address to a particular binding. The type element uses the XML schema language to declare complex data types and elements that are used elsewhere in the WSDL document. The WSDL IM model 404 is used for describing the mappings between the Java SEI and its WSDL representation.

The STJ mappings model 406 contains a model for describing mappings between XSD types and Java classes representing a group of classes and interfaces in Java packages, such as a name which is either derived from the XML namespace URI, or specified by a binding customization of the XML namespace URI, a set of Java content interfaces representing the content models declared within the schema, and a set of Java element interfaces representing element declarations occurring within the schema. The configuration model 408 includes both the design-time and runtime configuration of web services and web services clients. The configuration model 408 may also include one or more description descriptors or files, such as XML configuration files, deployment descriptors, etc.

In one embodiment, the WSDL IM model 404 contains reference to and uses elements of interfaces with the WSDL model 402. The WSDL IM model 404 further contains reference to the STJ mappings model 406. The STJ mappings model 406, on the other hand, references to the WSDL model 402 and uses elements from the WSDL model 402. Examples of the elements that the STJ mappings model 406 uses include elements of XSD and/or type elements, such as complex type and simple type. The configuration model 408 contains reference to the WSDL model 402 and the WSDL IM model 404.

A virtual interface refers to an abstract interface and/or a type description system that is created based on a programming language interface (e.g., Java interface and ABAP methods). A virtual interface can be used to decouple the language-specific implementation from interface description. A web service refers to an interface of the web service as described by the WSDL file at the WSDL model 402, which describes web services methods and web services type systems, such as the XML messages transmitted upon the web services invocation. When the web service interface is generated via the virtual interface, it is done by having Java classes build the virtual interface to generate the WSDL file (web interface). This process of WSDL generation is carried in the engine by the WS runtime, while the virtual interface contains hints for WSDL generation details called SOAP extensions. A WSDL file provides proxy generator which generates Java classes (web services client proxy) and logical ports (that contain web services client configuration). Using the web services client proxy classes, application invoke the web services described by the WSDL file. Also, using logical ports, applications configure the web services client proxy.

In one embodiment, virtual interfaces and the virtual interface model are eliminated by having the web services development based on WSDL (web services interface) at the WSDL model 402 in an outside-in scenario. For example, on the server side, WSDL 402 provides proxy generator which generates default mappings that are then changed (e.g., updated as the desired by the developer or as necessitated) using an administrative/IDE tool, such as an IDE wizard, SAP Visual Administrator, and SAP Developer Studio, etc. This is then used by the proxy generator to generate Java beans with mapped Java methods and WSDL 402 and mappings and the configuration model 408. A developer can implement methods (logic) of the bean and thus, providing logic to the web services methods. Furthermore, the conventional inside-out scenario can be customized using administrative/IDE tools to be compatible with the new model 400. For example, in one embodiment, from Java classes a virtual interface can be created that generates default WSDL which provides a proxy generator which further generates default mappings. These default mappings (e.g., default Java mappings) are then changed or updated or customized to reflect the original Java interface for which the common WS model 400 can be used by using/reusing the outside-in deployment. On the client side, in one embodiment, WSDL at the WSDL model 402 provides a proxy generate which generates Java files and mappings and the configuration model 408. This mechanism provides having the same deployment entities for adapting various scenarios (e.g., inside-out and outside-in) and allows the common model 400 for development of such scenarios.

Figure 5:
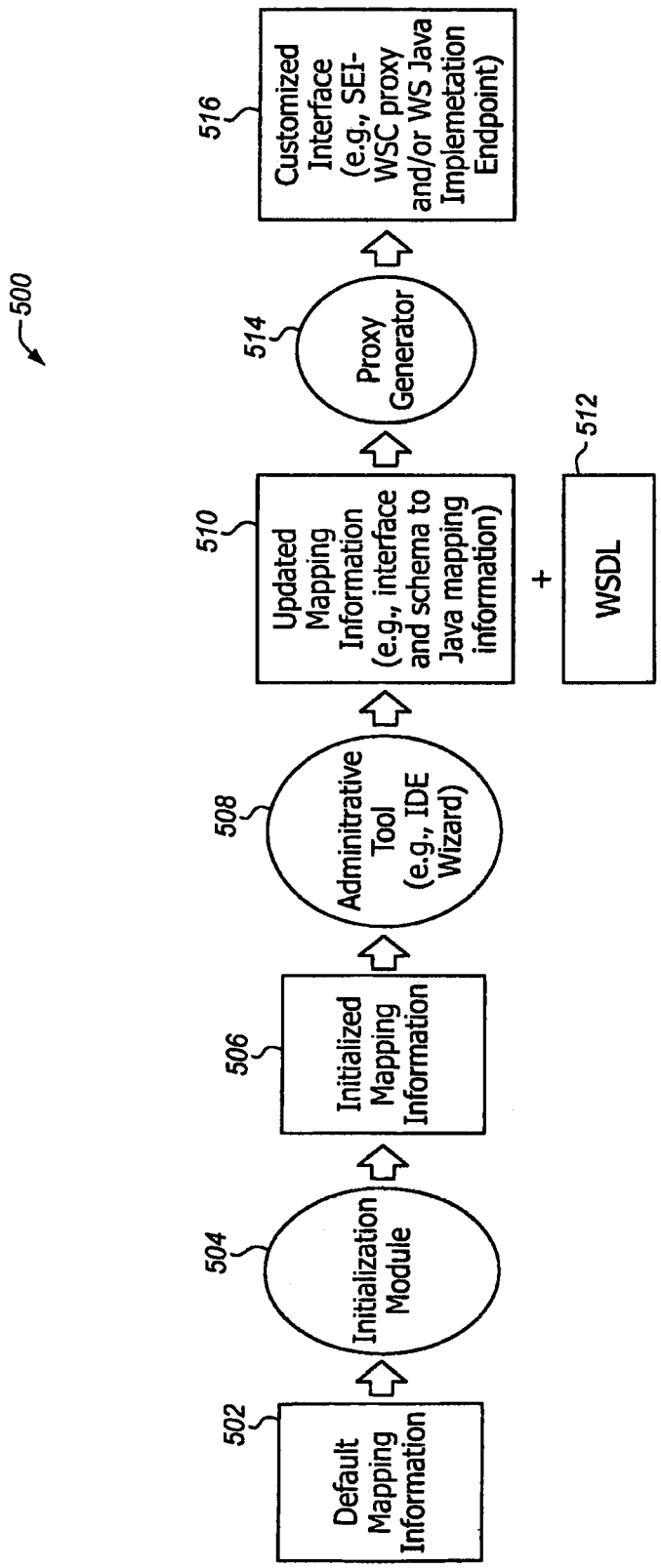
FIG. 5 illustrates an embodiment of a mechanism for generating customized interfaces.

FIG. 5 illustrates an embodiment of a mechanism 500 for generating customized interfaces 516. In one embodiment, the architecture or mechanism 500 represents an environment to generate a customized interface 516 having a service endpoint interface (SEI) 516 and/or a web services client via a WSDL document or model 512 that serves as a common mapping descriptor. Other models (e.g., WSDL IM and STJ models) can also be regarded as a common mapping descriptor along with the WSDL 512 as they are to be directly mapped and contain the updated mapping information 510 using the illustrated mechanism 500 and the mapping system of FIG. 4. The customized interface 516 can contain an SEI 516 which includes a web services client proxy and/or a web services Java implementation endpoint. The customized interface 516 may include a common WS and WSC interface. For example, first, as illustrated, mapping information 502 is to be initialized using an initialization module 504. The mapping information 502 may include default mapping information (e.g., Java Application Programming Interface-based XML Remote Procedure Call (JAX-RPC) interface mapping information) having interface mapping information and schema to Java mapping information. The mapping information 502 is initialized from a WSDL 512 into initialized mapping information 506 using the initialization module 504.

In one embodiment, the initialized mapping information 506 is then changed into customized mapping information 510 using an administrative tool 508 for customization purposes. The customized or updated mapping information 510 includes common mapping information for web services and web services client. The administrative tool 508 includes various SAP-based administrative/IDE tools and may also include various non-SAP based administrative/IDE tools. Examples of such administrative and/or IDE tools 508 include SAP NetWeaver Administrator, SAP Visual Administrator, SAP NetWeaver Developer Studio, IDE wizard, visual composition editor, a visual editor, a screen painter, a form designer, a visual IDE, and the like. In one embodiment, the customized or updated mapping information 510 is then used along with the WSDL 512 to help a proxy generator 514 generate common interface 516 including Java files having a Java SEI and/or a web services client. A service endpoint interface 516 may include a web services client proxy or java implementation endpoint of a web service. The updated mapping information 510 is split to be saved at a schema to Java model and a WSDL interface mapping model. The STJ and WSDL IM models along with the WSDL model 512 are included into the deployment of the web services client 518 and web services. The same mapping models of STJ and WSDL IM models are used to support both the client and the server scenarios. A direct mapping is achieved between the WSDL 512 and STJ and WSDL IM models, as illustrated in FIG. 4.

In one embodiment, the updated interface mapping information of the updated mapping information 510 resides at a WSDL IM model, while the updated schema to Java mapping information of the updated mapping information 510 resides at a STJ model. The proxy generator 514 generates customized interfaces (e.g., Java SEI) 516 that represent the mapped Java interface. In other words, the mapping information 510 is stored using separate entities and is used with the WSDL 512 to generate Java files by the proxy generator 514. In one embodiment, the proxy generator 514 resides at a J2EE engine. The proxy generator 514 can be separately created using a number of programming languages that are appropriate for the time, such as C, C++, C#, Java, and the like. Having the update mapping information and the generated WSDL 512 helps the proxy generator 506 create a customized interface 516 and provide direct mapping between various models, such as between the WSDL 512 and STJ and WSDL IM models.

Furthermore, customized interface 516 is created such that the mechanism 500 continues to support the existing mapping files and strategies, such as the interface-related part of the J2EE JAX-RPC mapping files. The proxy generator 514 provides Java files 516 without changing the XML schema. Further, the mechanism 500 can be used for design-time configuration of the WSDL 512 and the Java interface mapping information 510, and runtime configuration of web services client and server runtime. Using the direct mapping technique, the proxy generator 514 can be further used to generate various interfaces to provide additional external flexibility and interoperability.

A WSDL 512 refers to an XML document having the WSDL XML schema and other necessary elements such that the WSDL 512 is used to describe a web service. A WSDL 512 breaks down web services into three distinct elements, which are combined and reused, as necessary, while mapping from applications is mapping to these elements. The element are further divided into sub-elements, such as types, imports, message, portTypes, operations, binding, and services as described with reference to FIG. 4.

A WSDL 512 may also include abstract definitions and implementation definitions. The abstract definitions (e.g., in types, message, and portType elements) are used to define what the web service may look like, but not the message formats and protocols used to access an endpoint. The implementation definitions (e.g., in binding and service elements) are used to describe how the abstract definitions correspond to a specific SOAP messaging mode, Internet protocol, and internet address. In one embodiment, a portType can be mapped to an endpoint interface 516 using a mapping configuration file, such as an interface mapping file. Also, for example, a JAX-RPC compiler may be provided to generate an endpoint interface 516 to match the portType of the WSDL 512. JAX-RPC refers to a J2EE programming model to exchange SOAP messages based on documents definitions of the WSDL 512 to define how the WSDL 512 is used to generate endpoint and service interfaces 516, and the classes that implement them.

In one embodiment, a direct mapping compiler can be used with the proxy generator 514 to further define the mapping information 510 for providing direct mapping. Customized interface 516 can include a common WS and WSC-based interface, it is used here as an example and it is contemplated that various other forms of WS and WSC-based interfaces can be employed. Further, various Java beans and components, such as javax.xml, may also be generated and used depending on the complexity of message definitions used by the portTyp at the WSDL 512.

The updated mapping information 510 is used by the proxy generator 506 for the runtime defining of the relationship between customized interfaces 516, such as Java files, and Java beans, and between the WSDL 512 and its XML data types. A JAX-RPC compiler, and the like, can be used with the proxy generator 514 such that the mapping and interface properties are maintained in addition to providing direct mapping between the WSDL 512 and WSDL IM and STJ models. In one embodiment, using the mechanism 500, visual interfaces and visual interface type systems are eliminated to generate a particular WSDL 512 and save mapping information (interface mapping information and schema to Java mapping information) 510 at WSDL IM and STJ models, directly map the WSDL, WSDL IM, and STJ models, and directly mapped web services and Java interfaces to achieve increased interoperability. With the conventional virtual interface-based mechanism, mapping information was stored at a virtual interface and could not be used for direct mapping or customizing of interfaces or models.

Furthermore, the updated mapping information 510 may include information on each WSDL operation matching a method in the interface, and the input parameters and return types of the methods being mapped to WSDL part element. Such direct mapping also provides additional control over the nature and functionality of the WSDL 512 and offers interoperability. Having direct mapping and generating customized interfaces 516 is implemented to provide external flexibility and interoperability with external providers and servers as well as with internal consumers and clients. Additionally, such direct mapping 504 provides design-time configuration of the WSDL 512 (without changing its XML description format) and interface mapping information 510, and provides runtime configuration of web services, web services client, and server runtime to start and run web services and web services clients.

Figure 6:
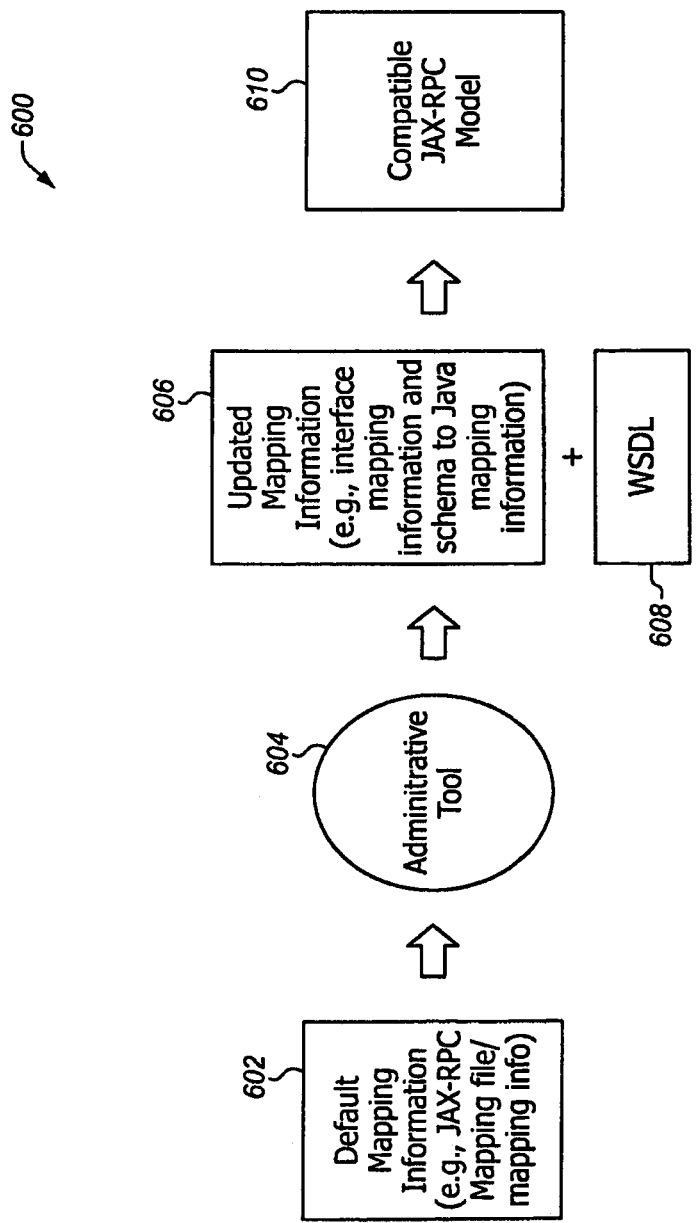
FIG. 6 illustrates an embodiment of a mechanism for customizing default mapping information when deploying web services client and/or web services application.

FIG. 6 illustrates an embodiment of a mechanism 600 for customizing default mapping information 602 when deploying web services client and/or web services application. In the illustrated embodiment, default mapping information 602 having a JAX-RPC mapping file is identified at deployment of J2EE web services client and/or web services application. The JAX-RPC mapping file 602 includes default JAX-RPC interface mapping information which can be changed into customized mapping information. Further, the default mapping information of the JAX-RPC file 602 can be maintained alongside the customized mapping information if needed or desired.

As with FIG. 5, an administrative tool 604, such as an SAP NetWeaver Administrator, IDE wizard, etc., is used to alter the JAX-RPC mapping information within the JAX-RPC file 602. The JAX-RPC default mapping information 602 is changed into updated mapping information 606 having interface mapping information and STJ mapping information that can be stored at a WSDL IM mapping model and a STJ mapping model, respectively. The default JAX-RPC mapping information 602 is changed such that it adapts to the customized interfaces and files. Stated differently, having the default JAX-RPC mapping information 602 updated, the compatible JAX-RPC model 610 is transformed or customized into being adapted into compatible with the local system having customized directly mapped web services and Java interfaces (e.g., Java SEI) and various mapping models. As described elsewhere in this document, the SEI includes web service client proxy or Java implementation endpoint of a web service. The WSDL 608 and two mapping models (e.g., WSDL IM mapping model and schema to Java mapping model) are included in the deployment of web services and web services client. The same mapping models are also used to support both client and server scenarios.

In one embodiment, using either one of the illustrate mechanisms 500, 600, the use of virtual interface and virtual interface-type system serving as an intermediary between various models (e.g., WSDL model, WSDL IM mapping model, and STJ mapping model) is eliminated and such models are directly mapped, providing direct mapping between web services interfaces and Java interfaces. This, in one embodiment, is accomplished by performing WSDL generation and modeling and changes made by one or more administrative tools 608, such as an SAP NetWeaver Administrator and/or a IDE wizard, to help develop web services interfaces that are directly mapped to Java interfaces to provide support for the outside-in approach. This leads to a common interface mapping descriptor (e.g., WSDL 608) for web services and web services client.

Figure 7:
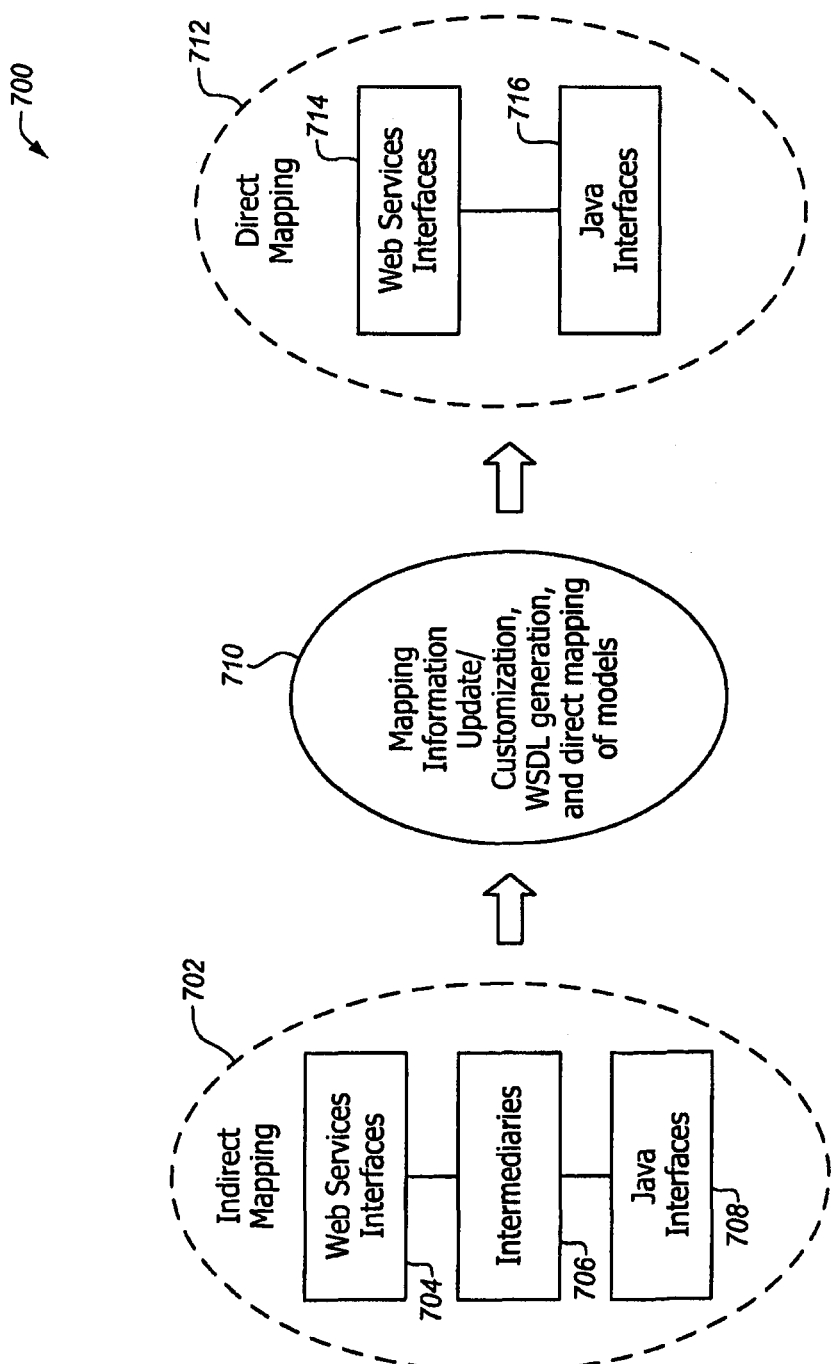
FIG. 7 illustrates an embodiment of a mechanism for directly mapping web services interfaces with Java interfaces.

FIG. 7 illustrates an embodiment of a mechanism 710 for directly mapping web services interfaces 714 with Java interfaces 716. As illustrated, conventionally, web services interfaces 704 and Java interfaces 708 communicate in indirect mapping 702 via intermediaries 706. The intermediaries 706 include a virtual interface or virtual interface type system as described elsewhere in this document. Using a mechanism of FIGS. 6A-6B, customization 710 of the default mapping information, generation of WSDL, and direct mapping of various models including a WSDL model and WSDL IM mapping and STJ models is achieved. It is contemplated that additional components, elements, modules, compilers (e.g., WSDL generation module, mapping descriptor compiler, and JAX-RPC compiler), and the like, can be used as part of or in addition to an initialization module, an administrative/updating tool (e.g., SAP NetWeaver Administrator, SAP Visual Administrator, SAP NetWeaver Developer Studio, and IDE wizard), and a generator (e.g., proxy generator). It is also contemplated that many of the components be removed and/or amended as necessitated by system requirements and/or as desired.

In direct mapping 712, web services interfaces 714 and Java interfaces 716 are mapped directly in which the interfaces 714, 716 communicate with each other directly without the need for any intermediaries 706. Customized interfacing provides direct mapping 712 of interfaces and mapping models, which, in turn, supports consumer-based outside-in approach. Directly mapped models are included into the deployment of web services and web services client. Using direct mapping 712, the same mapping models in the common model are used to support both client and server environments. In one embodiment, default mapping is initialized and then changed to using an administrative tool to provide direct mapping and customized interfaces. In another embodiment, when deploying J2EE web service client and/or web service application, JAX-RPC mapping file is changed into an interface mapping file and a STJ mapping file, which is to allow the JAX-RPC model to work with customized directly mapped interfaces and mapping models.

Figure 8A:
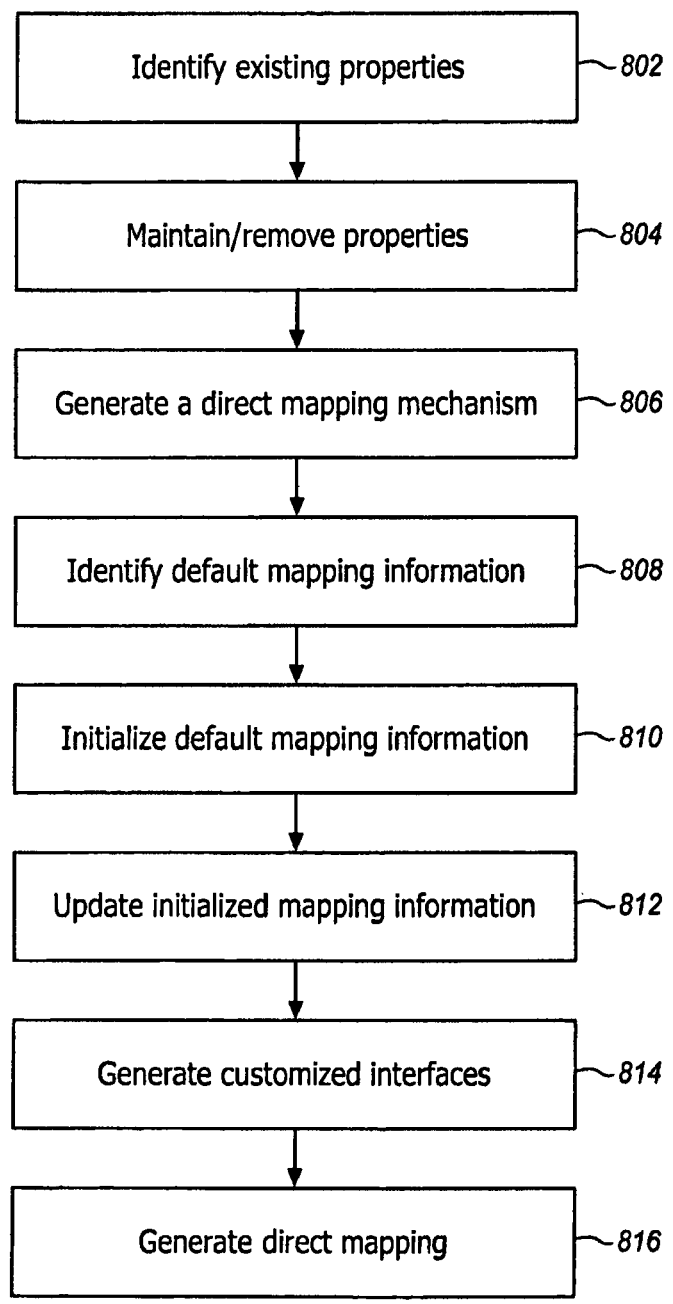
FIG. 8A illustrates an embodiment of a process for directly mapping interfaces and models.

FIG. 8A illustrates an embodiment of a process for directly mapping interfaces and models. First, various properties (including components, elements, compilers, modules, and the like) of a virtual interface-based mechanism (e.g., virtual interface and virtual interface type system) is identified at processing block 802. Certain properties that are not desired, not necessary, and/or not compatible with direct mapping are removed. On the other hand, those properties that are desired, necessary, and/or compatible with direct mapping are maintained and used at processing block 804. A direct mapping mechanism is generated using the identified properties at processing block 806. The direct mapping mechanism may include a number of components, elements, modules, and the like. For example, the direct mapping mechanism may include an identification module for identifying properties, an initialization module for initializing mapping information, an administrative/updating tool to update or change mapping information, a generator including a proxy generator to generate direct mapping, and the like. The direct mapping mechanism may reside at a web application server of a J2EE engine.

At processing block 808, default mapping information, including interface mapping information and schema to Java mapping information, etc., is identified. The default mapping information is initialized using an initialization module at processing block 810. The initialized mapping information is then updated or customized at processing block 812 using an administrative/IDE tool. At processing block 814, using the updated mapping information (e.g., interface mapping information and schema to Java mapping information) and a WSDL, customized interfaces are generated for direct mapping. Customized interfaces for direct mapping include web services interfaces and Java interfaces that are directly mapped. For example, customized interfaces include Java SEI generated by the proxy generator. The SEI further includes a web service proxy, a web services Java implementation endpoint, and the like. At processing block 816, direct mapping of web services and Java interfaces and various models (e.g., WSDL model, WSDL IM mapping model, and STJ mapping model) is provided.

Figure 8B:
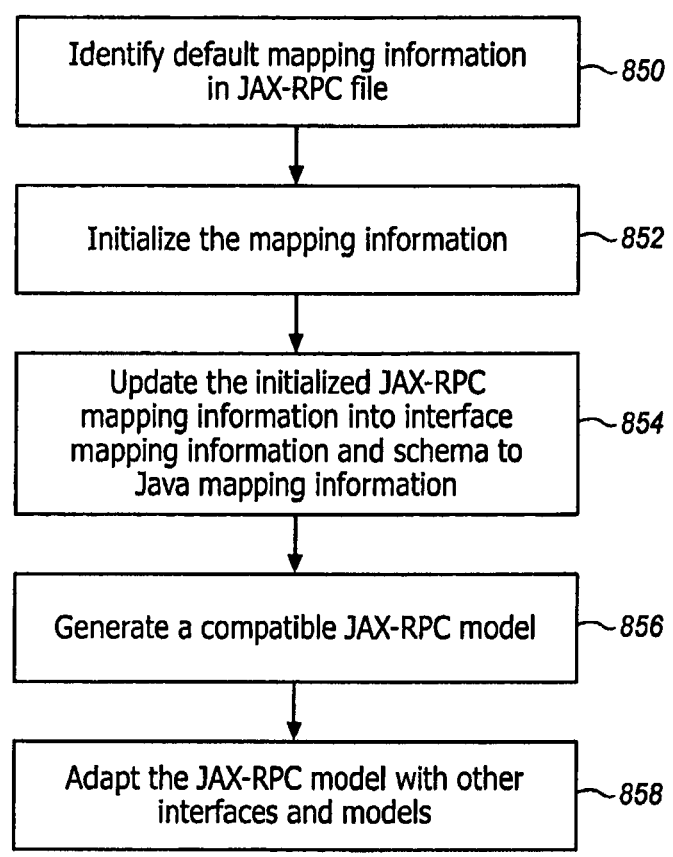
FIG. 8B illustrates an embodiment of a process for customizing a default mapping model.

FIG. 8B illustrates an embodiment of a process for customizing a default mapping model. In one embodiment, the direct mapping mechanism is generated such that it not only includes new or customized directly mapped models and interfaces, but also adapts default implementations and models (e.g., JAX-RPC). A JAX-RPC file having default interface mapping information is identified at processing block 850 and then, it is initialized via an initialization module at processing block 852. The initialized information is then updated using an administrative/updating tool at processing block 854. The updating of the initialized information is used to customize the JAX-RPC to generate a customized JAX-RPC that is compatible with other interfaces and models at processing block 856. At processing block 858, the JAX-RPC model is adapted with other web services and web services client interfaces and models that are directly mapped. The default mapping information of JAX-RPC is changed when a J2EE web services client and web services application is deployed.

The architectures and methodologies discussed above may be implemented with various types of computing systems such as an application server that includes a J2EE server that supports Enterprise Java Bean (EJB) components and EJB containers (at the business layer) and/or Servlets and Java Server Pages (JSP) (at the presentation layer). Of course, other embodiments may be implemented in the context of various different software platforms including, by way of example, Microsoft® NET, Windows®/NT, Microsoft Transaction Server (MTS), the ABAP platforms developed by SAP AG and comparable platforms.

Figure 9:
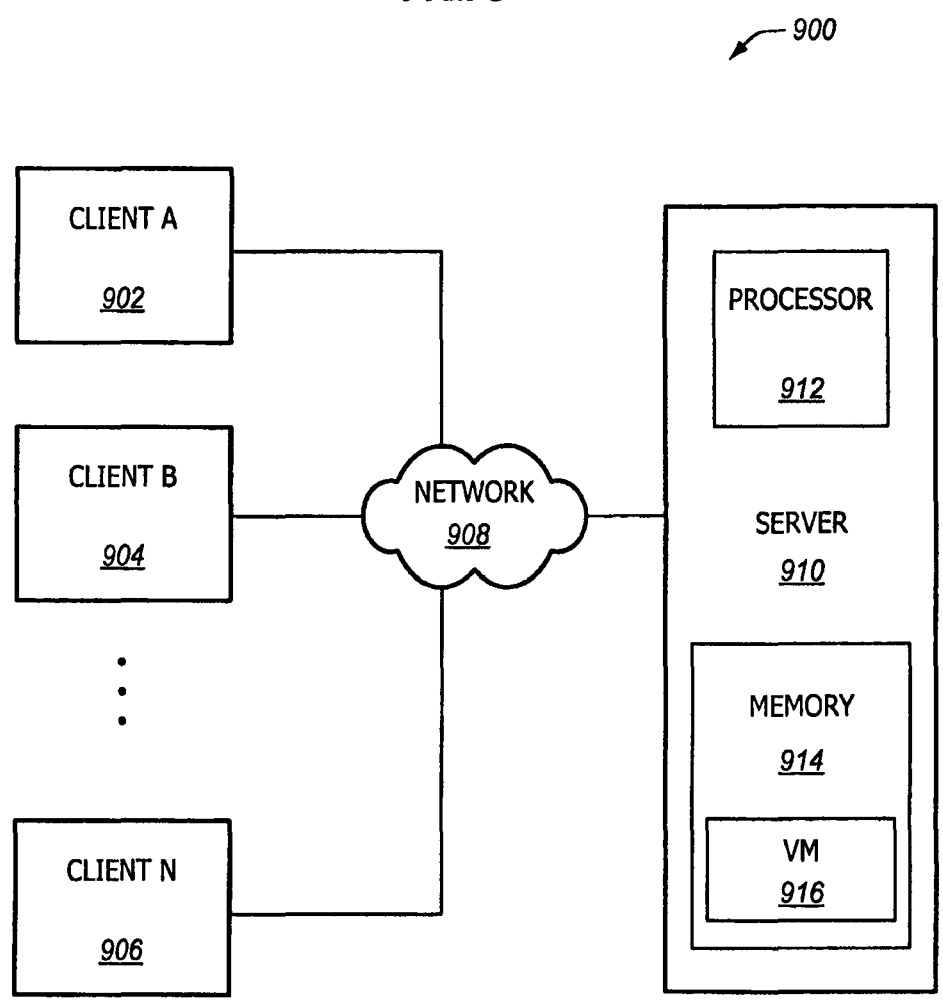
FIG. 9 illustrates an exemplary client/server system used for implementing an embodiment of the invention.

FIG. 9 illustrates an exemplary client/server system 900 used in implementing one or more embodiments of the invention. In the illustrated embodiment, a network 908 links a server 910 with various client systems A-N 902-906. The server 910 is a programmable data processing system suitable for implementing apparatus, programs, or methods in accordance with the description. The server 910 provides a core operating environment for one or more runtime systems that process user requests. The server 910 includes a processor 912 and a memory 914. The memory 914 can be used to store an operating system a Transmission Control Protocol/Internet Protocol (TCP/IP) stack for communicating over the network 908, and machine-executable instructions executed by the processor 912. In some implementations, the server 910 can include multiple processors, each of which can be used to execute machine-executable instructions.

The memory 914 can include a shared memory area that is accessible by multiple operating system processes executing at the server 910. An example of a suitable server to be implemented using the client/server system 900 may include J2EE compatible servers, such as the Web Application Server developed by SAP AG of Walldorf, Germany, or the WebSphere Application Server developed by International Business Machines Corp. (IBM®) of Armonk, N.Y.

Client systems 902-906 are used to execute multiple applications or application interfaces. Each instance of an application or an application interface can constitute a user session. Each user session can generate one or more requests to be processed by the server 910. The requests may include instructions or code to be executed on a runtime system (e.g., the virtual machine (VM) 916) on the server 910. A VM 916 is an abstract machine that can include an instruction set, a set of registers, a stack, a heap, and a method area, like a real machine or processor. A VM 916 essentially acts as an interface between program code and the actual processor or hardware platform on which the program code is to be executed. The program code includes instructions from the VM instruction set that manipulates the resources of the VM 916.

Figure 10:
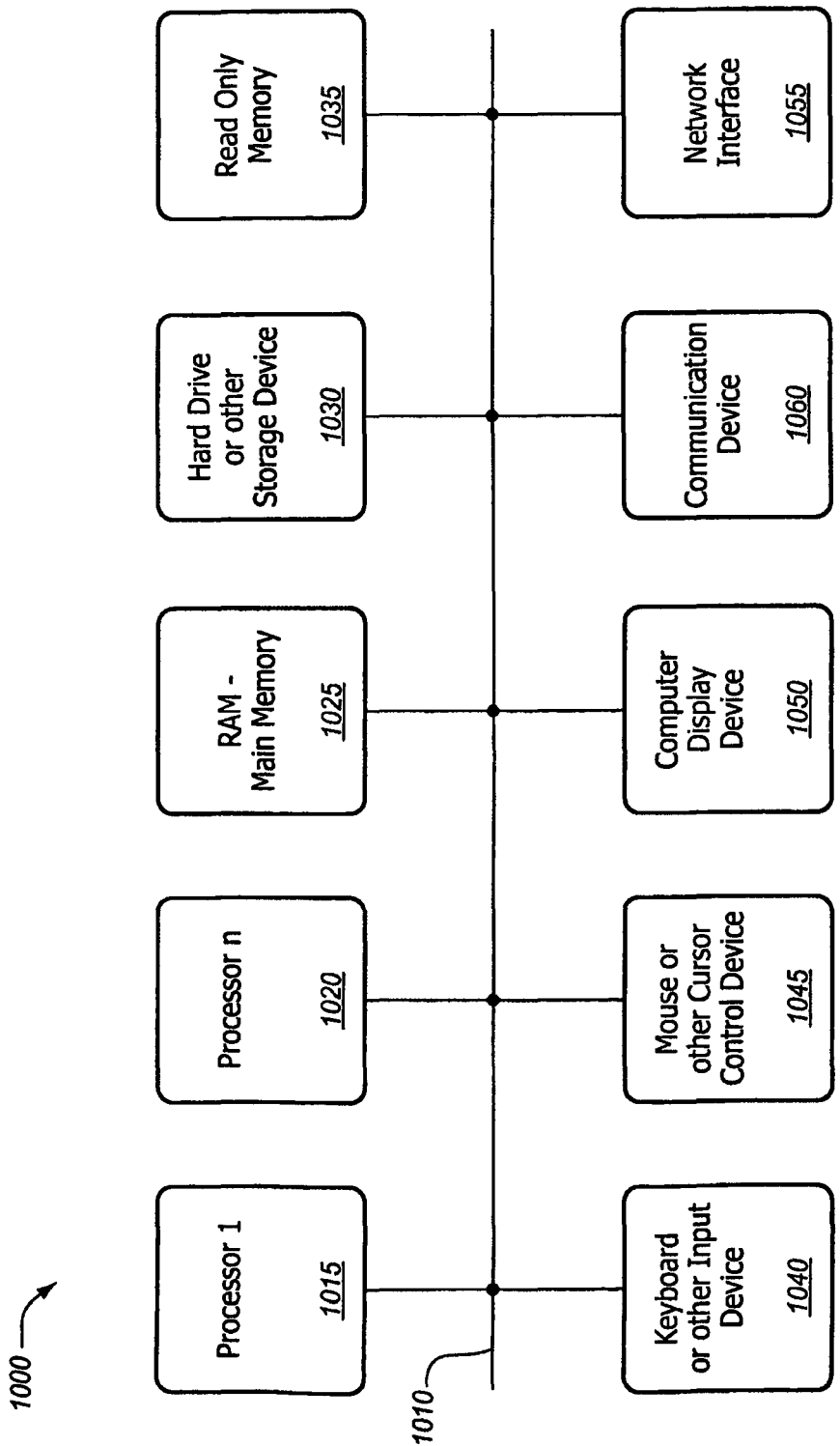
FIG. 10 is an exemplary computer system used in implementing an embodiment of the invention.

FIG. 10 is an exemplary computer system 1000 used in implementing an embodiment of the present invention. In this illustration, a system 1000 comprises a bus 1010 or other means for communicating data. The system 1000 includes one or more processors, illustrated as shown as processor 1 1015 through processor n 1020 to process information. The system 1000 further comprises a random access memory (RAM) or other dynamic storage as a main memory 1025 to store information and instructions to be executed by the processor 1015 through 1020. The RAM or other main memory 1025 also may be used for storing temporary variables or other intermediate information during execution of instructions by the processors 1015 through 1020.

A hard drive or other storage device 1030 may be used by the system 1000 for storing information and instructions. The storage device 1030 may include a magnetic disk or optical disc and its corresponding drive, flash memory or other non-volatile memory, or other memory device. Such elements may be combined together or may be separate components. The system 1000 may include a read only memory (ROM) 1035 or other static storage device for storing static information and instructions for the processors 1015 through 1020.

A keyboard or other input device 1040 may be coupled to the bus 1010 for communicating information or command selections to the processors 1015 through 1020. The input device 1040 may include a keyboard, a keypad, a touch-screen and stylus, a voice-activated system, or other input device, or combinations of such devices. The computer may further include a mouse or other cursor control device 1045, which may be a mouse, a trackball, or cursor direction keys to communicate direction information and command selections to the processors and to control cursor movement on a display device. The system 1000 may include a computer display device 1050, such as a cathode ray tube (CRT), liquid crystal display (LCD), or other display technology, to display information to a user. In some environments, the display device may be a touch-screen that is also utilized as at least a part of an input device. In some environments, the computer display device 1050 may be or may include an auditory device, such as a speaker for providing auditory information.

A communication device 1050 may also be coupled to the bus 1010. The communication device 1050 may include a modem, a transceiver, a wireless modem, or other interface device. The system 1000 may be linked to a network or to other device using via an interface 1055, which may include links to the Internet, a local area network, or another environment. The system 1000 may comprise a server that connects to multiple devices. In one embodiment the system 1000 comprises a Java® compatible server that is connected to user devices and to external resources.

While the machine-readable medium 1030 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1000 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1000 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a NET environment, a Windows/NT environment each provided by Microsoft Corporation).

It should be noted that, while the embodiments described herein may be performed under the control of a programmed processor, such as processors 1015 through 1020, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

The invention claimed is:

1. A system comprising:
   at least one hardware processor; and
   memory comprising instructions that, when executed by the at least one hardware processor, cause the system to perform operations comprising:
   accessing interface mapping information for compatibility of at least one interface of a web service application and at least one interface of a web service client application with a common interface;
   accessing schema-to-language-specific mapping information for compatibility of at least one schema of the web service application and at least one schema of the web service client application with a language specific interface; and
   deploying at least one of the web service application and the web service client application together with the interface mapping information, the schema-to-language-specific mapping information, and a common mapping descriptor.

2. The system of claim 1, wherein the common interface provides direct mapping between a web services interface and a language-specific interface.

3. The system of claim 2, wherein the language-specific interface comprises a Java interface.

4. The system of claim 3, wherein the schema-to-language-specific mapping information comprises schema-to-Java mapping information.

5. The system of claim 1, wherein the interface mapping information is generated based on respective interface information of the web service application the web service client application, the respective interface information comprising information stored in a Java Application Programming Interface-based Extensible Markup Language Remote Procedure Call (JAX-RPC) file.

6. The system of claim 1, wherein the common mapping descriptor comprises a Web Service Description Language (WSDL) model, and the interface mapping information comprises a WSDL interface mapping model.

7. The system of claim 6, wherein the WSDL interface mapping model describes mappings between a service endpoint interface (SEI) and a representation in WSDL of the SEI.

8. The system of claim 1, wherein the common interface comprises an SEI to specify methods of a class that are to be exposed as web services operations.

9. The system of claim 8, wherein the SEI comprises at least one of a web services client proxy and a web services implementation endpoint.

10. A method comprising:
accessing interface mapping information for compatibility of at least one interface of a web service application and at least one interface of a web service client application with a common interface;
accessing schema-to-language-specific mapping information for compatibility of at least one schema of the web service application and at least one schema of the web service client application with a language specific interface; and
deploying at least one of the web service application and the web service client application together with the interface mapping information, the schema-to-language-specific mapping information, and a common mapping descriptor.

11. The method of claim 10, wherein the common interface provides direct mapping between a web services interface and a language-specific interface.

12. The method of claim 11, wherein the language-specific interface comprises a Java interface.

13. The method of claim 12, wherein the schema-to-language-specific mapping information comprises schema-to-Java mapping information.

14. The method of claim 10, wherein the interface mapping information is generated based on respective interface information of the web service application the web service client application, the respective interface information comprising information stored in a Java Application Programming Interface-based Extensible Markup Language Remote Procedure Call (JAX-RPC) file.

15. The method of claim 10, wherein the common mapping descriptor comprises a Web Service Description Language (WSDL) model, and the interface mapping information comprises a WSDL interface mapping model.

16. The method of claim 15, wherein the WSDL interface mapping model describes mappings between a service endpoint interface (SEI) and a representation in WSDL of the SEI.

17. The method of claim 10, wherein the common interface comprises an SEI to specify methods of a class that are to be exposed as web services operations.

18. The method of claim 17, wherein the SEI comprises at least one of a web services client proxy and a web services implementation endpoint.

19. A non-transitory machine-readable storage medium comprising instructions that, when executed by at least one processor of a machine, cause the machine to perform operations comprising:
accessing interface mapping information for compatibility of at least one interface of a web service application and at least one interface of a web service client application with a common interface;
accessing schema-to-language-specific mapping information for compatibility, of at least one schema of the web service application and at least one schema of the web service client application with a language specific interface; and
deploying at least one of the web service application and the web service client application together with the interface mapping information, the schema-to-language-specific mapping information, and a common mapping descriptor.

20. The machine-readable storage medium of claim 19, wherein:
the common interface provides direct mapping between a web services interface and a language-specific interface;
the language-specific interface comprises a Java interface; and
the schema-to-language-specific mapping information comprises schema-to-Java mapping information.

* * * * *